Feb. 6, 1962 W. R. SPAULDING 3,019,654
THERMOMETER SPINNER
Filed July 13, 1959

INVENTOR.
William R. Spaulding
BY
Horey, Schmidt, Johnson & Hovey
ATTORNEYS.

United States Patent Office 3,019,654
Patented Feb. 6, 1962

3,019,654
THERMOMETER SPINNER
William R. Spaulding, 6027 W. 76th Terrace,
Prairie Village, Kans.
Filed July 13, 1959, Ser. No. 826,824
1 Claim. (Cl. 73—373)

This invention relates to a spinner device for shaking down a medical thermometer and has for its primary object the provision of power means for rotating the thermometer within its case with great and abrupt force to thereby quickly and easily shake the thermometer down and eliminate the time-consuming and more difficult hand operation heretofore practiced.

Another important object of the present invention is to provide a device of the aforementioned character that includes a shaft that may be spring-loaded by simply rotating the same in one direction, whereby upon release of the shaft, the thermometer and its case are spun quickly in the opposite direction to shake down the thermometer A further object of the present invention is to provide a thermometer spinner that is relatively small and compact by virtue of its foldability, permitting it to be carried around by a physician in his pocket.

Figure 2:
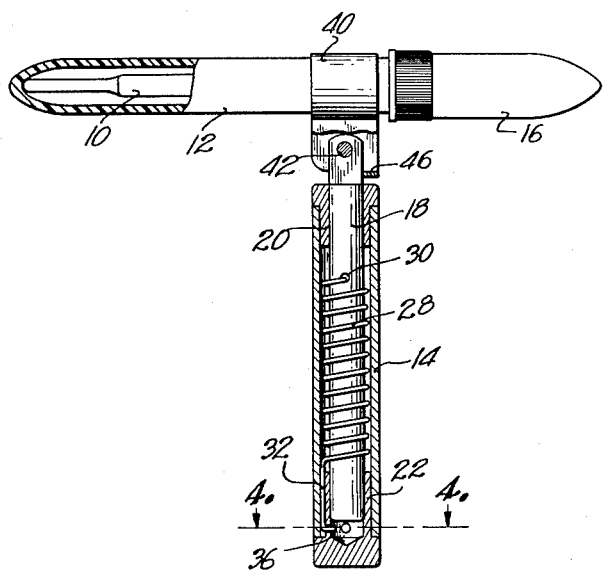
FIG. 2 is a side elevational view partially in section but showing the thermometer case at right angles to the shaft upon which it is mounted.

The spinner for medical thermometers 10 forming the subject matter of the instant invention includes a pair of tubes 12 and 14, the former being provided with a cap 16 and serving as an elongated container for the thermometer 10, as clearly shown in FIG. 2.

While the tube 12 serves as a support for the thermometer 10 the tube 14 supports a shaft 18 through the medium of a sleeve 20 extending into one end of the tubular support 14, and a sleeve 22 extending into the opposite end of the support 14. Fasteners 24 and 26 releasably hold the sleeves 20 and 22 respectively attached to the support 14.

Figure 4:
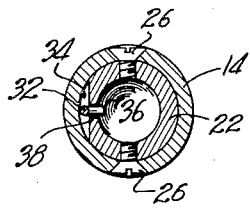
FIG. 4 is an enlarged, transverse, cross-sectional view taken on line 4—4 of FIG. 2.

Shaft 18 is rotatable within the sleeves 20 and 22 and is surrounded by a spring 28 having one end thereof extending into an opening 30 in the shaft 18 whereby to attach the spring 28 to the shaft 18. A short stretch 32 at the opposite end of the spring 28 extends into a space 34 between sleeve 22 and the tube 14 that is presented by flattening the sleeve 22 as shown in FIG. 4. Stretch 32 terminates in a lateral end 36 that extends through an opening 38 in the sleeve 22, thereby attaching the spring 28 to the support 14.

The case 12 is attached to the shaft 18 through the medium of a clamp 40 that embraces the outermost end of the shaft 18 which extends beyond the tube 14, shaft 18 being flattened for such purpose and having pivotal connection with the clamp 40 through the medium of a pin 42.

Figure 1:
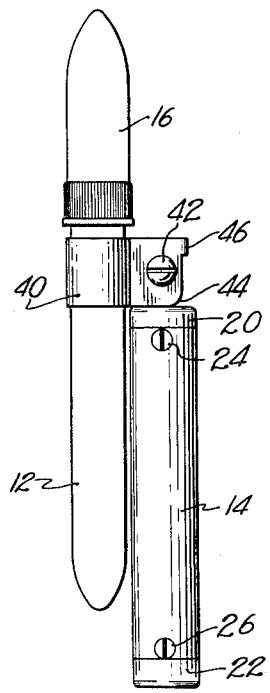
FIG. 1 is a side elevational view of the thermometer spinner made pursuant to my present invention.

While the tubes 12 and 14 are relatively perpendicular when the device is placed in use, the pivot pin 42 permits swinging of the container 12 to the position shown in FIG. 1 where it is in parallelism with the support 14.

During the swinging movement, rounded edges 44 of clamp 40 slide along the outer end of the sleeve 20 and when the parts are in the position illustrated by FIG. 2, a stop 46 on clamp 40 bears against the shaft 18.

Figure 3:
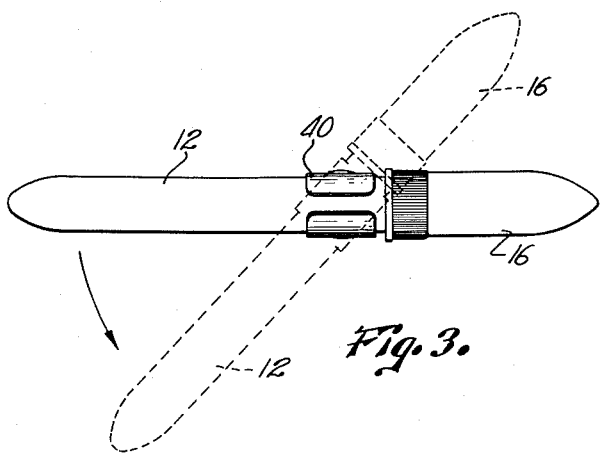
FIG. 3 is a top plan view showing in dotted lines the rotational movement of the thermometer case.

In use, the operator grasps the support 14 and rotates the case 12 in the direction shown by the arrow in FIG. 3 to wind the spring 28. This may be accomplished with one finger and only one or two revolutions are necessary, whereupon the operator permits his finger to slide off the end of case 12 so that the same will spin back quickly and relatively great force. This adequately shakes down the thermometer 10, placing it in condition for use by merely removing cap 16 and taking the thermometer out of the case 12.

The extent of winding of the spring 28 is limited by the latter becoming tightly engaged with the shaft 18. Conversely, however, it is to be noted in FIG. 2 that the support 14 rather closely surrounds the spring 28 when the latter is unwound, thereby preventing undue rotation of the case 12 in the opposite direction. In other words, the spring 28 cannot be inadvertently unwound to a point of damaging the spring 28.

Having thus described the invention what is claimed as new and desired to be secured by Letters Patent is:

A spinner device for shaking down a medical thermometer by centrifugal force comprising a tubular case for a thermometer to be spun, the case having a detachable closure; an elongated, tubular support having opposed open ends; a first sleeve carried by said support at one end thereof, said first sleeve having a first section closing said one end externally of the latter and a second section integral with said first section and telescoped within said support, said second section having an opening therein proximal to the junction thereof with said first section and being provided with cylindrical inner and outer surfaces, the outer surface having a flat portion extending from the innermost end of said second section to said opening; a second sleeve having a central opening therethrough and carried by the support at the opposite end thereof, said second sleeve having a pair of integral segments, one of said segments being telescoped within said support and the other of said segments being disposed externally of said support; means releasably securing said sleeves to said support; an elongated shaft within said support, one end of said shaft being in engagement with the inner surface of said second section, the opposite end of said shaft passing through the opening in said second sleeve and extending outwardly from the latter; hinge means swingably attaching the case to the shaft on the opposite end of the latter and intermediate the ends of the case, the shaft normally extending laterally from the case, said case being swingable relative to said shaft to a position substantially parallel with the latter; and an elongated coil spring surrounding said shaft within said support, one end of said spring being secured to said shaft proximal to the opposite end thereof in spaced relation to said second sleeve, the opposite end of said spring extending between said support and said flat portion and inserted within said opening to thereby secure said shaft to said support.

References Cited in the file of this patent

UNITED STATES PATENTS

| | | |
|---|---|---|
| 2,426,776 | Le Sage | Sept. 2, 1912 |
| 1,041,135 | McIntyre | Oct. 15, 1912 |